Figure 3:
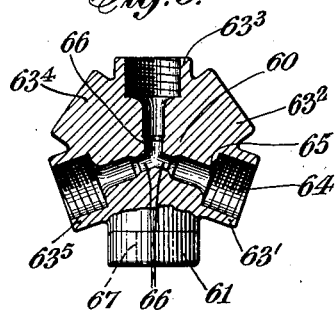

Oct. 10, 1933.  E. H. KOCHER  1,929,434
LIQUID DISTRIBUTING INSTALLATION AND THE ELEMENT THEREOF
Original Filed July 18, 1925  2 Sheets-Sheet 1
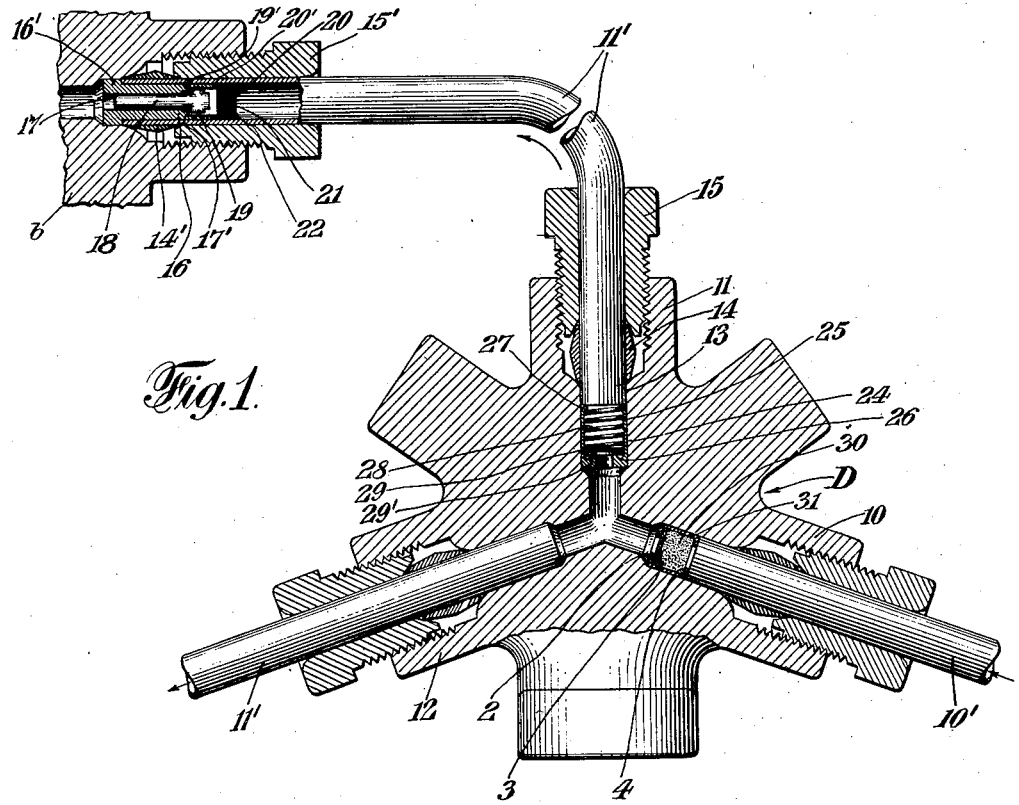
Inventor
Edward H. Kocher
By his Attorneys Patented Oct. 10, 1933

1,929,434

UNITED STATES PATENT OFFICE 1,929,434

LIQUID DISTRIBUTING INSTALLATION AND THE ELEMENT THEREOF

Edward H. Kocher, Boonton, N. J., assignor to Auto Research Corporation, a corporation of Delaware Application July 18, 1925, Serial No. 44,498
Renewed April 8, 1930

23 Claims. (Cl. 184—7)

My present invention relates primarily to liquid feeding and distributing installations and fittings and while of more general application, has a preferred use in lubricating systems and a specific application to automobile chassis lubrication.

It is an object to provide an installation of the type mentioned composed of simple and inexpensive elements, easily associated with each other and applied to the structure mounting the installation, to provide a rugged, inobtrusive assembly unlikely to be disturbed even when employed on a moving apparatus, such as the chassis of an automobile, and which shall assure reliable distribution of the lubricant or other fluid in accordance with requirements at the various bearings to be supplied.

Another object is to provide an installation of the type mentioned which shall not leak or drip lubricant between operations and which shall not become clogged with dirt or dust in the course of use.

The invention is more particularly concerned from one aspect with flow control instrumentalities associated with various outlets of the piping system and has among its special objects to provide an instrumentality of this character which shall involve substantially no added bulk of installation as compared with one devoid of flow control means.

Another object is to provide flow control means wholly of machined or stamped parts requiring no expensive or skilled manual labor in its manufacture or assembly, yet inherently operating with a fine degree of accuracy.

In a preferred embodiment, the flow control instrumentality comprises a small cartridge shell of diameter such as can be readily inserted into the bore of the pipe outlet and having preferably a restriction pin in a longitudinal bore thereof, both pin and bore of accurately predetermined almost equal diameters to impose a high resistance to flow therethrough. Preferably the pipe outlet is secured to the bearing or other sustaining structure by means of a conventional threaded bushing encircling the same and acting on a compression coupling sleeve to effect a tight joint, said sleeve preferably pressing the pipe outlet radially inward to effect gripping the exterior of the cartridge shell.

A spring seated relief valve is preferably associated with each pipe outlet and normally seated to prevent flow except under pressure. It is preferable to provide valves of relatively large diameter, the area of which would accordingly be subjected to greater effective oil pressure during functioning of the system, than would a smaller valve, thus overcoming a substantial spring which in turn is desirable to effect secure seating of the valve. Such large diameter valves could not be inserted in the small diameter pipe bore and to make the cartridge of diameter sufficiently large to accommodate the valve would be inconsistent with inserting it into the pipe end and would, moreover, entail the use of a larger mounting socket and a larger threaded bushing. These objections are all avoided by locating the valve beyond the end of the pipe, but forming it in a unitary structure with the cartridge that is inserted into the pipe end. In another embodiment, the valve may be disposed at the junction fitting, from which the flow control outlet is supplied, such junction fitting affording sufficient space to accommodate a valve of desired diameter.

The restriction outlet fitting is not limited in its application to the extremities of the pipe system but may be disposed in branches provided in the run of the pipe line, in which case, said branches are preferably the stems of T fittings secured to the adjacent ends of pipe line segments which they connect, said stems being secured to the corresponding sockets, each by a threaded bushing and compression sleeve.

The invention from another aspect is concerned with fluid or lubricant dividing or junction units affixed to the frame structure and affording one or more inlets and one or more outlets for various pipe sections.

Among the objects are to provide a simple, inexpensive and durable junction fitting, to which the pipe terminals can be readily applied.

Another object is to provide a construction of the type mentioned which may be readily adapted for mounting of any of a variety of numbers of pipe terminals to effect division through any of a number of branches.

Another object is to provide a fitting of the type referred to, which can be readily mounted to the supporting structure in any of a variety of relations in accordance with the shape or form of the structure.

Another object is to provide a compact fitting of the type referred to which will adequately sustain and protect a delicate flow controlling instrumentality.

The invention may be embodied in a unitary casting, which includes a unitary supporting or mounting flange and may be readily bored or drilled in accordance with requirements for accommodating any of a variety of numbers of branches.

Figure 4:
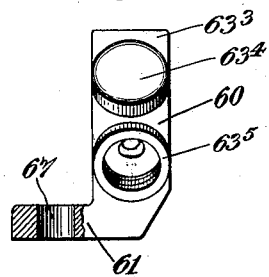
Figure 6:
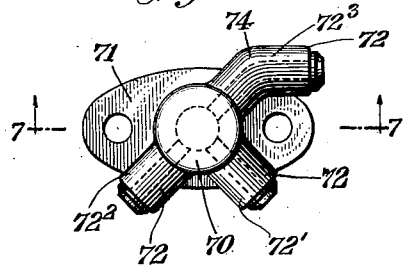
Figure 5:
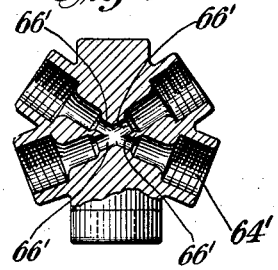
Figure 7:
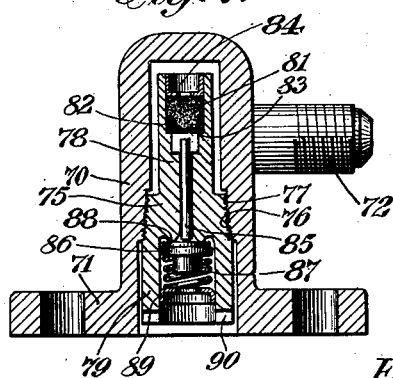

In the accompanying drawings in which are shown one or more of various possible embodiments of the several features of this invention, Fig. 1 is a fragmentary view of one form of piping installation, on an enlarged scale, Fig. 2 is a view similar to Fig. 1 of part of another form of such installation, parts thereof being shown on different scales, Fig. 3 is a view in longitudinal cross-section of one form of junction fitting, Fig. 4 is an edge view of the embodiment shown in Fig. 3, Fig. 5 is a view similar to Fig. 3 of another embodiment of junction fitting, Fig. 6 is an elevation of another form of junction fitting, and Fig. 7 is a view in longitudinal section taken along the line 7—7 of Fig. 6.

In Fig. 1 appears a fragmentary view of an arrangement for the mounting of a piping installation and more especially for a lubricating installation. I have shown a dividing fitting D having a plurality of outlets which may, if desired, be of the construction disclosed and claimed in my copending application, Serial No. 37,435, filed June 16, 1925, but is here illustratively shown of another construction to be described hereinafter. In this embodiment, I have shown three terminals, an inlet 10 supplied from a pipe 10', and an outlet 11 which through a pipe construction now to be described, leads lubricant in a controlled manner to a bearing diagrammatically indicated at b. Another outlet is shown at 12 which may lead to a pipe constructed and arranged as that at 11, but is here indicated in a relation in which it would lead to another junction fitting, as will appear more fully below. The conduits 11' as also the conduit 10' may be of seamless metal pipe preferably of copper, the inlet end of which is inserted into the bore 13 coaxial with fitting terminal 11 and is encircled by a compression coupling sleeve 14 of more or less conventional construction, the end of said pipe pressing against a suitable abutment and a more or less conventional bushing 15 encircles the pipe end, is threaded into socket 11 and exerts a wedging pressure on the compression sleeve to cause the latter to securely grip the pipe and hold the same firmly in position.

The bearing end of the pipe is secured by a similar arrangement of parts, shown in the drawings, corresponding elements bearing the same reference numerals as those just described, but primed. In order to control the flow, I have illustratively shown in this embodiment, a restriction outlet device which comprises a cartridge, or shell 16 of small diameter extending into the pipe end and having a head 16' beyond the pipe end of diameter r preferably equal to the outer diameter of the pipe and constituting a stop for the end thereof. This shell may be of metal and has within a longitudinal bore 17 thereof a metallic restriction pin 18, both the pin and bore of accurately predetermined diameter to afford a minute or highly restricted outlet, which will determine the rate of flow. The pin 18 has outstruck lugs 19 resting on a corresponding shoulder 19' in the cartridge and the lower or outer end of the pin is between the ends of the cartridge as shown. The bore 17 is countersunk at the head of pin 18, as shown at 17' to avoid any undue local restriction at the edge of the bore. A strainer plug is preferably disposed in advance of the restriction pin and serves to intercept any scale or chips carried with the lubricant which might otherwise become lodged at the restriction pin. This strainer plug comprises a felt plug 20 pressed against a disk 21 of fine mesh wire gauze and fits against shoulder 20' within the correspondingly reduced end of the cartridge, the rim of the cartridge being turned inward as at 22 to retain the felt plug in place.

In a preferred embodiment, the restriction cartridge need not be frictionally fitted into the pipe, but may be relatively loosely placed therein and it will be understood that in applying the threaded bushing 15', the compression coupling sleeve 14' will constrict the pipe wall 11' when affixed and thereby frictionally grip the cartridge 16 and prevent the latter from moving or dropping out of the pipe end.

It will be noted that the restriction unit in this embodiment is especially compact and, in fact, does not add to the bulk of the terminal, the entire fitting being substantially wholly enclosed within the pipe itself. Moreover, this flow control unit is completely protected by the encircling construction and presents no protruding part likely to be broken off or injured. The mode of application is especially easy, the cartridge is merely inserted into the end of the pipe, which then is inserted into the socket associated with the bearing after the threaded bushing 15' and compression sleeve 14' have been slipped thereover, whereupon the mere tightening of the bushing 15' into its threaded socket completes the assembly.

The present embodiment is devoid of the relief valve which would preferably be employed to prevent the seepage of lubricant from the pipe line by gravity flow during the intervals between the successive applications of pressure to the pipe line. I have embodied such relief valve construction in this case in the junction fitting. The junction fitting is formed with a socket 24 coaxial with the threaded socket 11 and nearer the center of the fitting. In socket 24, there is friction-fitted a relief valve unit which comprises a pressed metal shell 25 having a unitary valve seat 26 at the inner end thereof, the shell being turned inward as at 27 at its outer end to constitute a reaction end for the coil compression spring 28 located within the shell, and which serves to press an appropriate relief valve 29 therein against the seat. The relief valve is preferably a disk with an oiled silk facing 29' as and for the purpose of that described in the copending application of Joseph Bijur, Serial No. 596,856 filed October 25, 1922. In this embodiment, it will be noted that the shell 25 for the relief valve may serve as the abutment for the pipe end 11'.

To protect the relief valve 29 against being disabled by the lodging at its seat of small chips or scale which might be entrained with the oil led thereinto, and to similarly protect any other valves or restriction elements at other outlets of the fitting, I prefer to provide at the inlet 10 to the fitting, a felt strainer plug 30 generally similar to that shown at 20 in the restriction outlet. This felt strainer plug is shown housed in a shell 31 having a flange 2 retaining a fine mesh screen 3 in contact with the end of the felt plug, the other end of the shell being inturned as at 4 to maintain the plug in place therein and to constitute an abutment for the end of the inlet pipe 10'.

It will be understood that the complete installation consists generally of a plurality of junction fittings, each having an inlet supplied through an intervening pipe from the source of lubricant or from another junction fitting, those inlets or outlets of the junction fittings that are not connected to other junction fittings leading to bearings. In such installation, according to my invention, each junction fitting inlet has a strainer plug therein, and each of those outlets of the junction fittings that leads to a bearing has a relief valve therein, each pipe outlet at a bearing having a restriction and a felt plug therein. The nipple 12 in Fig. 1 is shown devoid of either relief valve or strainer plug, and is connected by an intervening length of pipe, as previously indicated, to another dividing fitting, the inlet of which latter would have a strainer plug like that at 30 in fitting D.

In Fig. 2 is shown another embodiment of restriction fitting of the general type shown at Fig. 1, which, however, embodies in a unitary construction therewith the relief valve and, therefore, necessitates no separate relief valve at the opposite end of the line. In this embodiment, the cartridge 32 is generally similar to that in Fig. 1, but its head is formed with an enlarged socket 33 therein, which extends beyond the pipe, the external diameter of said socket being preferably of substantially the same diameter as that of the pipe. A coil compression spring 36 retained in place by the inwardly turned rim 37 of the socket 33 presses a suitable disk relief valve 38 similar to valve 29 against the seat 39 formed at the inner end of the socket 33. The wire mesh backing 41 for the felt strainer plug 40 is pressed against a shoulder 42 in the cartridge, and a plurality of tongues 43 struck in from the end of the cartridge grip the plug 40 and hold the same in a unitary assembled structure with the cartridge.

The relief valve 38 preventing the stem 18' from falling out of the fitting, the outstruck lugs 19 shown in Fig. 1 are dispensed with. The cartridge 32 preferably fits with small clearance and not by a friction fit into the end of the pipe, the shoulder 34 on the cartridge constitutes an abutment for the end of the pipe 35 and the open end of the socket 33, in turn, abuts a shoulder 45 formed in the bearing $b'$. The compression coupling sleeve about the pipe, as in the embodiment of Fig. 1 serves to press the metal of the pipe inward to securely grip the cartridge when threaded bushing 47 is applied and prevents the same from shifting.

Both of the embodiments of flow controlling or drip plug fittings shown in Figs. 1 and 2 are of general application in lubricating installations, more particularly in centralized lubricating installations, especially where a multiplicity of outlets or bearings are to be supplied in parallel concurrently from a single centralized source of lubricant and pressure.

While each of the flow controlling cartridges may be fitted into any suitable support or sleeve, to drip into a bearing or reservoir either directly or through an intermediate pipe length, the fittings above described are more especially designed and intended for mounting into the end of a pipe or tube of compressible metal, as described.

The invention is not limited to terminal application as just described, but may be also applied to control the flow of lubricant from the run of the line. Fig. 2 also shows such an arrangement associated more especially with a T fitting formed of compressible metal tubing. As shown, two sections of pipe length 35 and 35' are connected together by a tubing sleeve 48 which encircles the adjacent ends of the pipe lengths and has a stem 50 brazed in a corresponding opening midway between the ends thereof. The metal of sleeve 48 is rolled inward at one or more places as at 49 or soldered to securely connect the pipes in lubricant-tight relation, the stem 50 extending from between the ends of pipes 35 and 35'. The stem 50 is shown plugged with a flow controlling restriction unit 51 illustratively identical with that at the other extremity of pipe length 35, said unit being shown only in outline, the shoulder 34' for protruding hollow head or socket 33' being abutted by the extremity of stem 50, although the construction of fitting shown in Fig. 1 may be employed, if desired, in which case the arrangement of valve shown in Fig. 1 would be employed. A compression sleeve 52 and a threaded bushing 53 similar to the arrangement shown in the other figures effect attachment of the T fitting to the associated bearing $b^2$. The bushing when tightened will here force the compression sleeve 52 inward to grip the tubular stem 50 of the T fitting and to force the metal thereof inward to grip the restriction cartridge 51 within the interior thereof.

The method of applying a piping installation of the type shown in Fig. 2 will be readily understood. The length of piping is previously made up of the various T fittings 50 connecting individual pipe lengths 35. The restriction unit assemblies 51 are inserted into the corresponding branch stems 50, which latter are then inserted into the corresponding sockets in the lubricated structure, the threaded bushings 53 and compression sleeves 52 having previously been slipped over the free ends of said branch stems 50. The threaded bushings 53 are now tightened which operation concurrently results in gripping the flow control cartridges and anchoring the branch stems 50, and thereby the entire length of piping, to the sustaining structure.

As previously indicated, the extremities of the pipe line are similarly applied, the control cartridge 32 being inserted into the pipe end, the threaded bushing and compression sleeve slipped thereover, the pipe end being inserted into the socket therefor in the bearing and the threaded bushing being then threaded home.

In Figs. 3, 4 and 5, I have shown separately the junction fitting indicated in Fig. 1. This comprises a unitary casting which may be of brass or any appropriate material and which includes a hub 60 and a lug 61 unitary therewith preferably protruding at right angles to the hub from one side thereof. The hub has a plurality of short circular bosses 63 radiating therefrom, preferably at uniform angular intervals, as shown. In this embodiment, five such bosses are shown, the extreme ones 63' and $63^5$ intercepting an obtuse angle, which straddles the supporting or mounting lug 61.

The castings of the type shown may be kept in stock and machined as required to provide the desired junction fitting. In Fig. 3 is shown an application in which only three bosses 63', $63^3$ and $63^5$ are machined to provide in each a tapped socket 64 having a reduced curved shoulder 65 and a reduced diameter therebeyond and a bore 66 of further reduced diameter extending inward to the center of the casting, the three bores of the three sockets intersecting as shown. The lug 61 is bored as at 67 for application to the supporting frame or structure, which application may be made by means of a screw (not shown) as in the disclosure of my copending application above referred to. It will be noted that the flange may be disposed to overlap either a horizontal or a vertical surface and be disposed in accordance with available space. The fitting shown, having three terminals, will accommodate an inlet pipe at any one of these and two branch or outlet pipes at the other two terminals, as indicated in Fig. 1.

Fig. 5 shows a mode of machining or treatment of the fitting or casting of Fig. 1, to accommodate four pipe terminals, it being noted that four bores 66' at the interior of sockets bored and tapped at 64' in every way identical with those shown in Fig. 3, will intersect preferably at the center of the casting.

It is understood, of course that the fitting shown might be formed with only two sockets or with five sockets, one in each boss. It will also be understood that where less than five sockets are used, the same may be bored in a corresponding number of the bosses, selected as desired. While I have shown and prefer an arrangement of junction fitting in which the pipe terminals are effected by compression couplings, it will be understood that some or all of these terminals may be constructed for flare terminals or terminals of other type.

In Figs. 6 and 7 is shown another embodiment of junction fitting, which shall not only provide for direct distribution of lubricant in more than two paths, but shall also afford an outlet for emission of lubricant in a controlled manner to an adjacent lubricated element. This embodiment includes a dome-shaped casting 70 having a flange 71 extending at right angles from the open end thereof, the desired number of nipples 72 integrally cast with the dome-shaped member protruding generally radially from near the closed end thereof. In this instance, three such nipples 72', 72² and 72³ are shown, the latter having an angle bend 74, so that its threaded end may extend generally parallel to the major axis of the flange 71 for convenient application of a pipe terminal after the fitting has been applied, for instance, said major axis extending lengthwise of the channel frame of an automobile. Any one of the nipples may serve as the inlet and the other two as the outlets for lubricant.

Within the dome 70 I provide a flow controlling cartridge, which may be generally similar to that shown in the T fitting disclosed in my copending application, Serial No. 32,014, filed April 10, 1925. I have here shown a specifically different embodiment comprising a cartridge 75 having a pipe thread 76 intermediate its ends for coaction with the correspondingly tapped portion 77 of the dome, said cartridge of reduced diameter at the innermost part 78 to afford a substantial clearance with respect to the inner wall of the dome, the outer portion 79 beyond the thread limiting the insertion of the cartridge. The cartridge is provided with a socket at its innermost end within which is disposed a strainer plug of felt 81 backed preferably by a disk or cup 82 of fine wire mesh pressed against a shoulder 83 therein and held in place by a perforated cup 84 friction-fitted thereinto. The main part of the length of the cartridge is preferably provided with a longitudinal bore within which fits a metal pin 85 also of accurately predetermined diameter, affording minute clearance with respect to the bore. At the outer end, there is provided a relief valve 86 generally similar in construction to those heretofore disclosed and pressed by a coil spring 87 against a seat 88 adjacent the end of the pin 85, said spring held in place by a perforated friction-fitted cap 89. The outer end of the cartridge 75 is preferably provided with a fillister slot 90 which may be engaged with a screw driver for mounting the cartridge in the dome-shaped fitting.

I claim:—

1. In a lubricating installation, the combination of a junction fitting having pipe terminal sockets adapted one for insertion of the end of an inlet pipe, another for insertion of the end of an outlet pipe, means coupling the respective pipe ends into direct engagement with the corresponding sockets of the junction fitting, said fitting having a third and open terminal for pipe connection to the inlet of a companion junction fitting, the socket for the inlet pipe having a unit of strainer material lodged at the inner end thereof, and the socket for the outlet pipe having a relief valve unit lodged at the inner end thereof.

2. In a lubricant flow installation, in combination, a pipe length, fixed terminals to which the extremities of said pipe length are directly connected, said terminals comprising a junction means having a socket for the inlet end of the pipe length, and a fixed bearing member having a socket for the outlet end of said pipe length, bushings encircling the respective pipe ends and effecting tightening thereof with respect to said fixed terminals, a relief valve unit within the socket for the inlet end of said pipe length, and flow controlling means within the socket of the fixed bearing member for the outlet end of said pipe length.

3. In a lubricant flow installation, in combination, a junction fitting, a fixed bearing member, a pipe length between said fitting and said bearing member, means coupling the extremities of said pipe length respectively directly to both said fitting and to said bearing member, said means including bushings encircling the ends of said pipe length, a relief valve unit fixed in a corresponding socket in the junction fitting beyond the inlet end of said pipe length and constituting a stop for said end, and a flow-restricting cartridge inserted within the outlet end of said pipe length and secured in position by tightening of the corresponding bushing into the bearing member.

4. A lubricant installation comprising junction fittings, pipe lines connecting the same in a common circuit, and outlet pipes leading from said junction fittings to bearings to be lubricated, a strainer at the inlet of each of said junction fittings, a relief valve at each of those outlets of the junction fittings that mount pipes leading directly to bearings, and flow control means substantially at the bearing ends of said latter pipes.

5. A lubricating installation comprising junction fittings, pipe lines connecting the same in a common circuit and outlet pipes leading from said junction fittings to bearings to be lubricated, a plug of strainer material in a corresponding socket at the inlet of each of said junction fittings, a relief valve in a corresponding socket in each of those outlets of the junction fittings that mount pipes leading directly to bearings, flow control restriction means within the bearing ends of said pipes, said means having plugs of strainer material at the inlets thereof.

6. In a liquid distributing system, in combination, a one piece junction fitting having openings for connections for an inlet pipe terminal and a plurality of outlet pipe terminals, a pipe leading from one of said outlet pipe terminal openings to a bearing, and flow obstructing and regulating devices lodged in one or more of said openings and held in position by the ends of the pipes.

7. In a lubricating installation, in combination, a one piece junction fitting having a plurality of sockets machined therein, inlet and outlet pipe terminals positioned in said sockets, the pipe terminal connected to one of said sockets leading to a bearing, and relief valve and filter plug units held in the inner ends of said sockets by said pipe terminals.

8. In a lubricating system, a dividing or junction fitting having a plurality of pipe terminal sockets, one of said sockets for an inlet pipe terminal having a plug of strainer material lodged at the inner end thereof and another of said sockets for an outlet pipe terminal having a spring seated relief valve unit lodged in the inner end thereof and pipe terminals inserted within said sockets and connected to the outer ends of said sockets.

9. In a lubricating installation, in combination, a junction fitting having pipe terminal sockets adapted one for insertion of the end of an inlet pipe into engagement therewith, another for insertion of the end of an outlet pipe into engagement therewith, means coupling the respective pipe ends for direct engagement with the corresponding sockets of the junction fitting, said fitting having a third and open terminal for pipe connection to the inlet of a companion junction fitting, the socket for the inlet pipe having a unit of strainer material lodged at the inner end thereof and the socket for the outlet pipe having a relief valve unit lodged at the inner end thereof.

10. In a lubricant flow installation, in combination, a junction fitting, a fixed bearing member, a pipe length between said fitting and said bearing member, means coupling the extremities of said pipe length respectively directly to said fitting and said bearing member, said means including threaded bushings encircling the ends of said pipe lengths, a relief valve unit fixed in a corresponding socket in the junction fitting beyond the end of said pipe length and constituting a stop for said end and a flow restricting cartridge inserted within the outlet end of said pipe length and retained against dropping therefrom by tightening of the corresponding bushing into the bearing member.

11. A central lubricating installation for a plurality of spaced bearings including a series of piping sections, a plurality of flow obstructing units, and a plurality of junction fittings, each junction fitting comprising a unitary casting including a hub, having a unitary supporting lug protruding therefrom and a plurality of pipe terminal bosses radiating from said hub and adapted to be selectively bored to communicate with each other at the center of the fitting, said fittings being supported adjacent but removed from said bearings by said lugs and connected thereto by pipe lengths and obstructing units being inserted in said bosses between said pipe terminals and said bores.

12. A central lubricating installation for a plurality of spaced bearings including a series of piping sections, a plurality of flow obstructing units, and a plurality of junction fittings, each junction fitting comprising a unitary casing embodying a hub and an integral lug protruding toward one side outward beyond the periphery of the hub, said hub having a plurality of short bosses radiating therefrom, the bosses nearest said supporting lug intercepting an obtuse angle straddling said lug, some of said bosses having sockets tapped thereinto for accommodating pipe terminal fittings, each of said tapped sockets having a bore of reduced diameter coaxially therewith, said bores intersecting, said fittings being supported adjacent but removed from said bearings by said lugs and connected thereto by pipe lengths and obstructing units being inserted in said bosses between said pipe terminals and said bores.

13. A lubricating installation comprising junction fittings, pipe lines connecting the same in a common circuit and outlet pipes leading from said junction fittings to bearings to be lubricated, a strainer at the inlet of each of said junction fittings, a relief valve in a corresponding socket in each of those outlets of the junction fittings that mount pipes leading directly to bearings, plugs of strainer material in the bearing ends of the various pipes, and flow control means between said latter fittings and the corresponding bearings.

14. A lubricating system for a series of bearings comprising a conduit system composed in part of a plurality of pipes, flow controlling devices in said conduit system and a series of junction fittings in said conduit system, said fittings being provided with bores of small diameter which are differently enlarged adjacent the outsides of the fittings to receive pipe ends and being spaced away from said bearings, being each connected thereto by one of said pipes and carrying flow controlling devices and coupling units, the enlarged portions of small width receiving the flow controlling devices and the enlarged portions of greater width being tapped and receiving correspondingly threaded coupling units serving as means of connection for the pipe ends.

15. A lubricating system for a series of bearings comprising a conduit system composed in part of main conduits and branch conduits leading therefrom to bearings, strainers in said main conduits adjacent to the point of connection of said branch conduits and restrictions positioned in said branch conduits adjacent to the bearings.

16. A lubricating system for a series of bearings comprising a conduit system composed in part of main conduits and branch conduits leading therefrom to bearings, strainers in said main conduits adjacent to the point of connection of said branch conduits and flow controlling cartridges adapted to fill completely the outlet ends of said branch conduits adjacent to the bearings, said cartridges being provided with flow restrictions.

17. In a lubricating installation, a mounting element provided with a lubricant passageway which passageway terminates in a socket, the outer portion of which socket is threaded, an unthreaded flow transmitting insert substantially enclosed in the socket and abutting the bottom of the socket, a pipe end inserted into the socket and stopped by said insert, a coupling nut cooperating with the threaded portion of said socket and deformable compression coupling means cooperating with and clamped between the wall of the socket structure and with said coupling nut to grip said pipe and insert together.

18. In a terminal combination for lubricant carrying pipes of a lubricant distributing system, a socketed bearing element, a ledge in said socket substantially above the bottom of the socket, a pipe end and a flow obstructing device positioned within said socket, a nut encircling said pipe end and closing the open end of said socket and a double tapered coupling means also positioned within said socket, said coupling means cooperating with the ledge and with the nut to clamp the pipe end in position in liquid tight fashion to said device, the flow obstructing device having a close telescoping fit with the pipe end.

19. In a terminal combination for lubricant carrying pipes of a lubricant distributing system, a socketed bearing element, a ledge in said socket substantially above the bottom of the socket, a pipe end and a flow obstructing device positioned within said socket, a nut encircling said pipe end and closing the open end of said socket and a double tapered coupling means also positioned within said socket, said coupling means cooperating with the ledge and with the nut to clamp the pipe end in position in a liquid tight fashion to said device, the pipe end being encircled by the ledge.

20. In a terminal combination for lubricant carrying pipes of a lubricant distributing system, a socketed bearing element, a ledge in said socket substantially above the bottom of the socket, a pipe end and a flow obstructing device positioned within said socket, a nut encircling said pipe end and closing the open end of said socket and a double tapered coupling means also positioned within said socket, said coupling means cooperating with the ledge and with the nut to clamp the pipe end in position in a liquid tight fashion to said device, the flow controlling device being a longitudinal unitary assembly and being positioned in said socket so as to extend through the portions of the socket on both inside and outside of said ledge.

21. In a lubricating installation, a mounting element provided with a lubricant passageway which passageway terminates in a socket, the outer portion of which socket is threaded, an unthreaded flow transmitting insert substantially enclosed in the socket and abutting the bottom of the socket, a pipe end inserted into the socket and stopped by said insert, a coupling nut cooperating with the threaded portion of said socket and deformable compression coupling means cooperating with and clamped between the wall of the socket structure and with said coupling nut to grip said pipe and insert together, the unthreaded flow transmitting insert being a flow controlling cartridge and containing a valve.

22. In a lubricating installation, a mounting element provided with a lubricant passageway which passageway terminates in a socket, the outer portion of which socket is threaded, an unthreaded flow transmitting insert substantially enclosed in the socket and abutting the bottom of the socket, a pipe end inserted into the socket and stopped by said insert, a coupling nut cooperating with the threaded portion of said socket and deformable compression coupling means cooperating with and clamped between the wall of the socket structure and with said coupling nut to grip said pipe and insert together, the insert being telescoped inside of the pipe end, and the deformable compression coupling means consisting of a double tapered sleeve which abuts upon a ledge in the side of the socket.

23. In a terminal combination for lubricant carrying pipes of a lubricant distributing system, a socketed bearing element, a ledge in said socket substantially above the bottom of the socket, a pipe end and a flow obstructing device positioned within said socket, said device abutting the bottom of said socket and said pipe end abutting said device, a nut encircling said pipe end and closing the open end of said socket and a double tapered coupling sleeve also positioned within said socket abutting said ledge at its inner end and said nut at its outer end, said coupling sleeve cooperating with the ledge and with the nut to clamp the pipe end in position.

EDWARD H. KOCHER.